US010800564B2

(12) United States Patent
Read

(10) Patent No.: US 10,800,564 B2
(45) Date of Patent: Oct. 13, 2020

(54) APPARATUS AND METHOD FOR CUTTING AND/OR CRIMPING WRAPPING MATERIAL

(71) Applicant: Oakbridge Investments Limited, Huddersfield (GB)

(72) Inventor: Alan James Read, Lancashire (GB)

(73) Assignee: OAKBRIDGE INVESTMENTS LIMITED, Huddersfield (GB)

(*) Notice: Subject to any disclaimer, the term of this patent is extended or adjusted under 35 U.S.C. 154(b) by 919 days.

(21) Appl. No.: 15/033,412

(22) PCT Filed: Nov. 5, 2014

(86) PCT No.: PCT/GB2014/053293
§ 371 (c)(1),
(2) Date: Apr. 29, 2016

(87) PCT Pub. No.: WO2015/067940
PCT Pub. Date: May 14, 2015

(65) Prior Publication Data
US 2016/0272352 A1 Sep. 22, 2016

(30) Foreign Application Priority Data
Nov. 5, 2013 (GB) .................................. 1319532.6

(51) Int. Cl.
B65B 51/30 (2006.01)
B65B 59/02 (2006.01)
(Continued)

(52) U.S. Cl.
CPC .............. B65B 51/30 (2013.01); B29C 65/02 (2013.01); B29C 65/743 (2013.01);
(Continued)

(58) Field of Classification Search
CPC ... B65B 51/30; B65B 11/0008; B65B 51/303; B29C 65/02; B29C 65/743;
(Continued)

(56) References Cited

U.S. PATENT DOCUMENTS 4,730,436 A 3/1988 Angelino
5,140,800 A 8/1992 Martin et al.
(Continued)

FOREIGN PATENT DOCUMENTS

EP 1911567 A1 4/2008
GB 486 947 A 6/1938
(Continued)

OTHER PUBLICATIONS

International Search Report for PCT/GB2014/053293 dated Jan. 21, 2015, 13 pages.
(Continued)

Primary Examiner — Chelsea E Stinson
Assistant Examiner — Mary C Hibbert-Copeland
(74) Attorney, Agent, or Firm — Klintworth & Rozenblat IP LLP

(57) ABSTRACT

A cutting, or crimping, apparatus having first and second opposed jaw members which are mounted on a frame and are movable relative to each other from a first axial position to a second axial position along an axis so as to respectively cut, or crimp, wrapping material extending between adjacent articles wherein at least one of the jaw members is rotatably mounted to the frame such that it is rotatable from a first rotational position to a second rotational position, in the first rotational position the jaw members are movable relative to each other along a first said axis and in the second rotational position the jaw members are movable relative to each other along a second said axis that is inclined relative to the first axis.

19 Claims, 16 Drawing Sheets

(51) Int. Cl.
    *B65B 11/00*        (2006.01)
    *B29C 65/00*        (2006.01)
    *B29C 65/78*        (2006.01)
    *B29C 65/02*        (2006.01)
    *B29C 65/74*        (2006.01)
    *B65B 61/06*        (2006.01)

(52) U.S. Cl.
CPC ........ *B29C 65/787* (2013.01); *B29C 66/1122* (2013.01); *B29C 66/4312* (2013.01); *B29C 66/816* (2013.01); *B29C 66/8246* (2013.01); *B29C 66/83221* (2013.01); *B29C 66/841* (2013.01); *B29C 66/849* (2013.01); *B65B 11/008* (2013.01); *B65B 59/02* (2013.01); *B65B 61/06* (2013.01); *B29C 66/71* (2013.01); *B29C 66/73921* (2013.01); *B29C 66/8122* (2013.01); *B29C 66/81457* (2013.01); *B29C 66/8242* (2013.01)

(58) Field of Classification Search
CPC ............... B29C 65/787; B29C 66/1122; B29C 66/4312; B29C 66/816; B29C 66/8246; B29C 66/83221; B29C 66/841; B29C 66/849

USPC .................. 53/450, 399, 556, 589, 441, 449
See application file for complete search history.

(56) References Cited

U.S. PATENT DOCUMENTS

| | | |
|---|---|---|
| 5,531,061 A | 7/1996 | Peterson |
| 2002/0178691 A1 | 12/2002 | Liao |
| 2007/0209323 A1 | 9/2007 | Honegger |
| 2008/0072537 A1 | 3/2008 | Hashimoto et al. |
| 2008/0184676 A1 | 8/2008 | Downhill |

FOREIGN PATENT DOCUMENTS

| | | | |
|---|---|---|---|
| GB | 2221868 A | 6/1989 | |
| WO | 2007/135088 A1 | 11/2007 | |
| WO | WO-2007135088 A1 * | 11/2007 | ............... B65B 9/06 |

OTHER PUBLICATIONS

Great Britain Search Report for GB 1319532.6 dated Jan. 13, 2014, 4 pages.

* cited by examiner

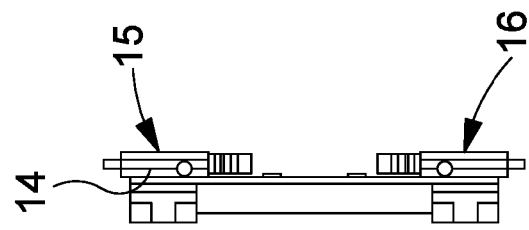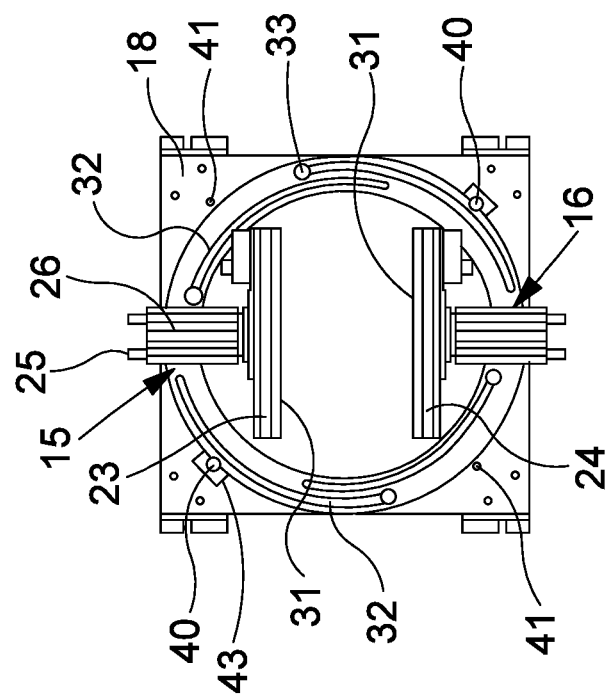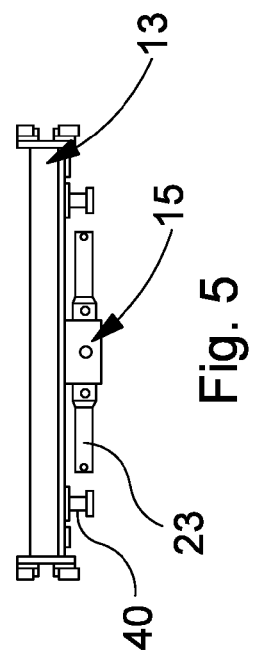

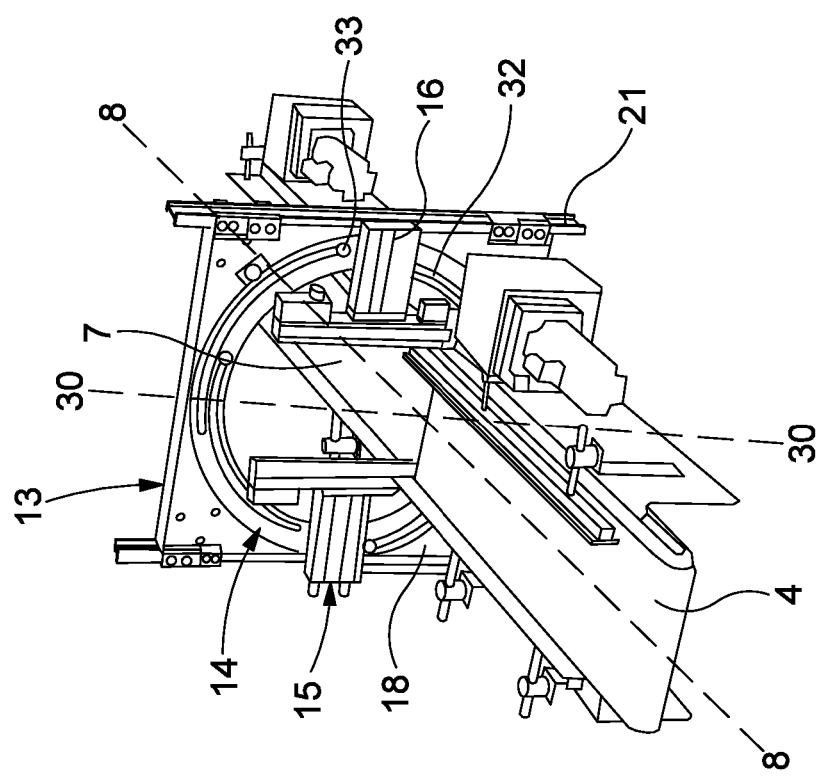

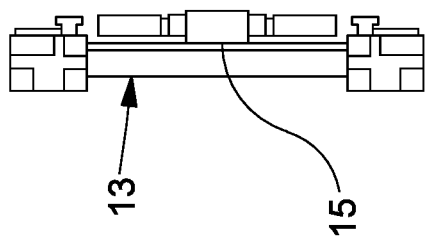
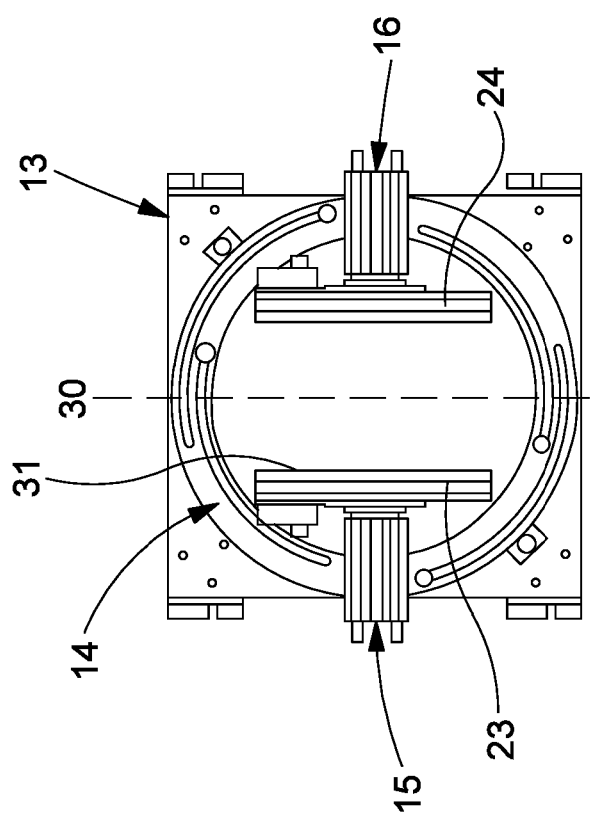
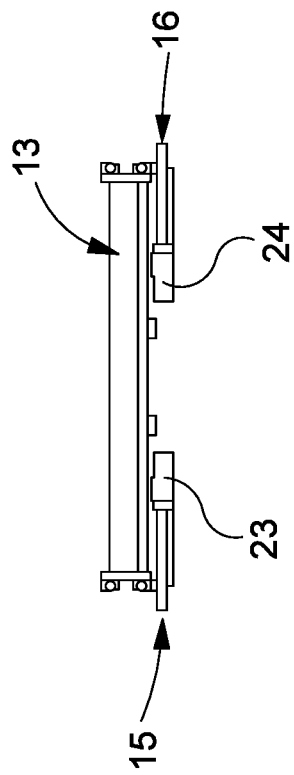

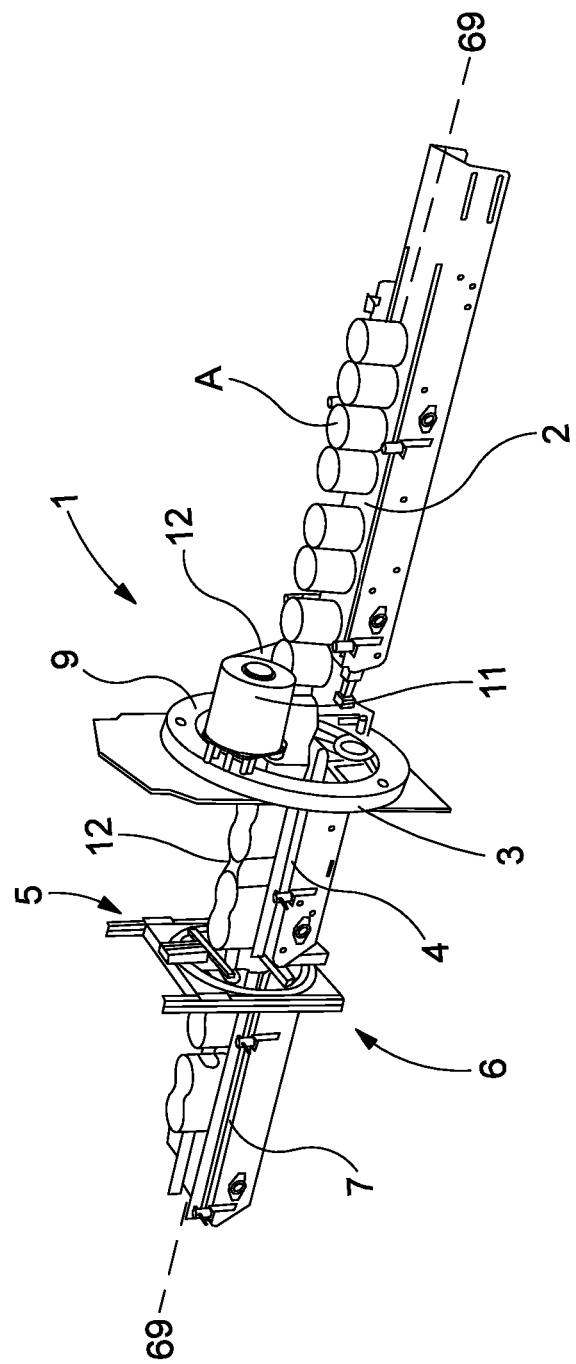

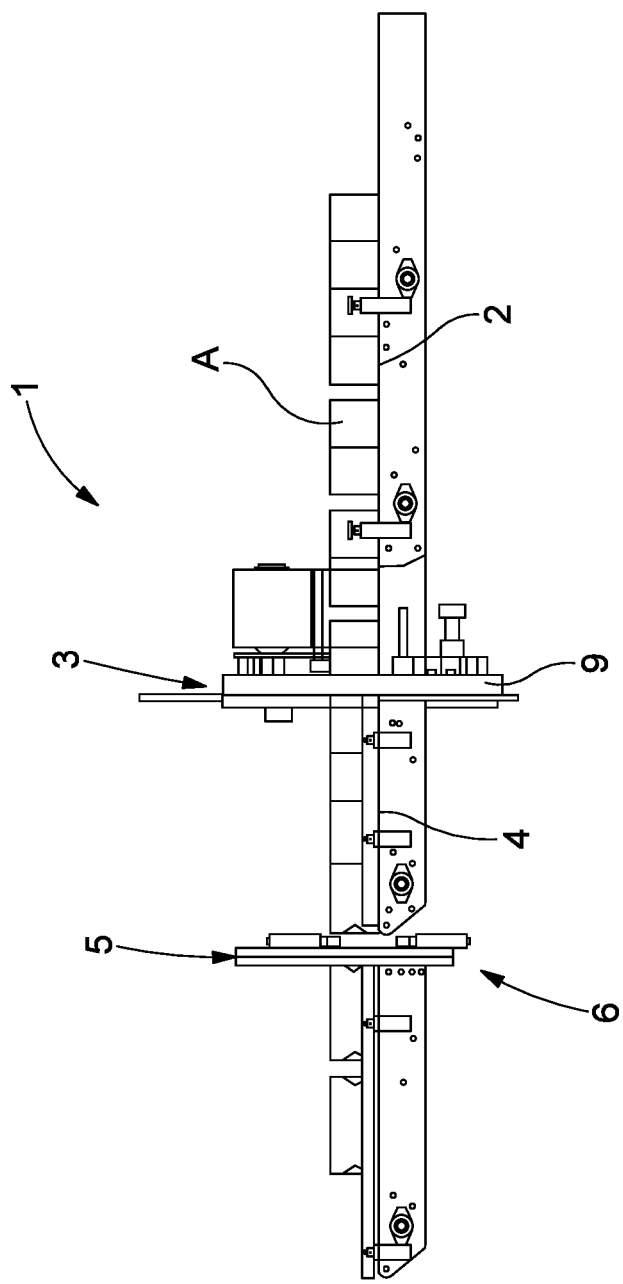

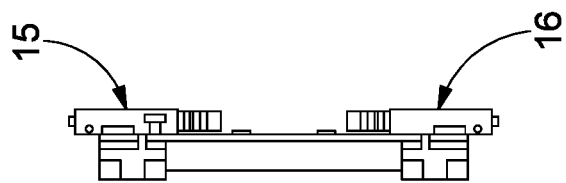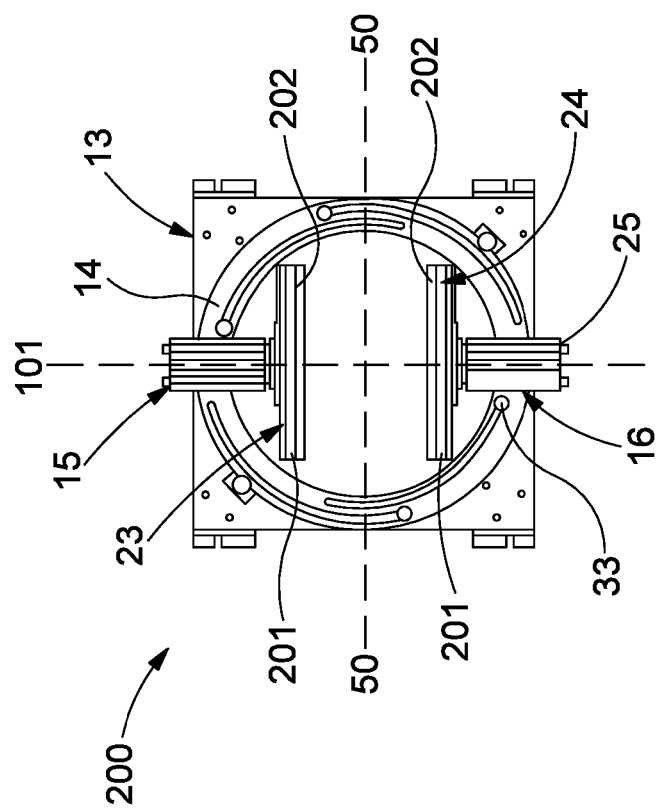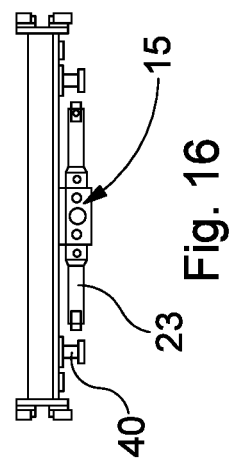

APPARATUS AND METHOD FOR CUTTING AND/OR CRIMPING WRAPPING MATERIAL

The present invention relates to an apparatus and assembly for, and method of, cutting and/or crimping wrapping material extending between articles, or collations of articles, in a production line environment. The present invention also relates to a packaging apparatus and method.

It is known to package articles by wrapping them in flexible sheet material such as, for example, highly stretched synthetic plastic film. An article, or a collation of articles, is typically enclosed between two sheets of material or a folded single sheet and the material is heat sealed at overlapping edges.

In a known helical wrapping machine articles are wrapped by winding a continuous web of wrapping material around the articles in a direction generally transverse to their direction of movement along the machine. This results in the articles being wrapped by a helical continuous web of material. The machine has an upstream conveyor that is separated from a downstream conveyor by a rotary ring-type web applicator whose rotary axis is generally parallel to the longitudinal axis of the conveyors.

As the collations of articles pass through the applicator, its ring rotates at a predetermined speed and dispenses the wrapping material. As a result, the articles are wrapped by a continuous helical band of material. The wrapped articles pass to the downstream conveyor which carries them to a cutting station. At the cutting station, the wrapped collations of articles are separated into individually wrapped collations of articles by cutting through the adjoining wrapping between each collation. The cutting station comprises a pair of opposed parallel cutting jaw members that are movable towards each other to cut the adjoining wrapping between each collation.

If it is desired to seal the wrapping at each end of the separated wrapped collations, the collations of articles are passed to a crimping station. At the crimping station the ends of the wrapping that extends around each collation are crimped by the crimping station, so as to seal ends of the wrapping together. The crimping station comprises a pair of opposed parallel crimping jaw members that are movable towards each other to crimp the wrapping at each end, so as to seal the wrapping at each end.

However, the applicant has identified that it can be sub-optimal to use the same configuration of cutting/crimping apparatus to cut/crimp articles of different shapes and sizes.

Accordingly, it is an object of the present invention to obviate or mitigate at least some of the problems which are apparent from the above.

According to a first aspect of the present invention there is provided a cutting, or crimping, apparatus comprising first and second opposed jaw members which are mounted on a frame and are movable relative to each other from a first axial position to a second axial position along an axis so as to respectively cut, or crimp, wrapping material extending between adjacent articles wherein at least one of the jaw members is rotatably mounted to the frame such that it is rotatable from a first rotational position to a second rotational position, in the first rotational position the jaw members are movable relative to each other along a first said axis and in the second rotational position the jaw members are movable relative to each other along a second said axis that is inclined relative to the first axis.

The applicant has identified that it is desirable to change the direction of axial movement of the jaw members, from their first axial position to their second axial position, depending on the dimensions and orientation of the articles. For example, if the articles carried on a conveyor to the cutting or crimping apparatus are relatively tall and narrow, the applicant has identified that it is preferable that the axial direction of movement of the jaw members is substantially horizontal. Conversely, if the articles are relatively short and wide the applicant has identified that it is preferable that the axial direction of movement of the jaw members is substantially vertical.

Orienting the axial direction of movement of the jaw members in this manner is advantageous in that it shortens the distance that the opposed jaw members need to travel in order to cut, or crimp, wrapping material extending between adjacent articles, thereby reducing the length of wrapping material that the jaw members need to cut or crimp through. In this respect, the length of wrapping material that each point on the jaw member has to cut or crimp through is reduced. This reduces the energy that is lost as heat during the cutting or crimping, thereby resulting in a more efficient cutting, or crimping, apparatus.

In addition, this change of orientation may be done quickly and easily. In this respect, it is not necessary to remove a cutting, or crimping, apparatus that has a first (e.g. horizontal or vertical) orientation of said axial direction of movement of the jaw members and to replace it with a separate cutting, or crimping, apparatus that has a second (e.g. vertical or horizontal) orientation of said axial direction. This therefore saves time and cost. In this respect, since the productivity of a production line apparatus is highly dependent on the number of articles that are wrapped per unit time, any stoppages in a production line result in a significant economic loss. In addition, costs are saved as it is not necessary to providing separate cutting, or crimping apparatuses with different jaw orientations and as it is not necessary to employ skilled personnel in order to change the cutting, or crimping, apparatus.

The at least one jaw member may rotate from its first rotational position to its second rotational position about an external rotational axis, i.e. about a rotational axis external of the jaw member. In this respect, the at least one jaw member may revolve about the rotational axis as it rotates from its first rotational position to its second rotational position. As it revolves it may not rotate about an internal axis.

As the at least one jaw member rotates from its first rotational position to its second rotational position it may also translate relative to the frame.

The at least one jaw member may be one of the jaw members. In this case, only one of the jaw members may rotate from the first rotational position to the second rotational position, relative to the frame. Alternatively, the at least one jaw member may be both of the jaw members. In this case, both the jaw members may rotate from the first rotational position to the second rotational position, relative to the frame.

Where the at least one jaw member is one of the jaw members, as this jaw member rotates relative to the frame, from its first rotational position to its second rotational position, it may rotate and/or translate relative to the other jaw member.

One or both of the jaw members may be movable relative to the frame so as to move the jaw members from their first axial position to their second axial position.

The jaw members may be movable relative to each other in translation along said first and second axes so as to respectively cut, or crimp, wrapping material extending between adjacent articles.

The jaw members may also be movable relative to each other from their second axial position to their first axial position.

At least one of the jaw members may be provided with a cutting head for cutting through wrapping material extending between adjacent articles. Both of the jaw members may be provided with a said cutting head.

The first and second jaw members may be arranged such that when they are in their second axial position, their cutting heads may or may not contact each other.

The cutting heads of the first and/or second jaw members may be provided with a heating element for cutting wrapping material by melting through it. In this case, the cutting heads may not contact each other when the jaw members are in their second axial position. Where the cutting heads of the first and second jaw members are both provided with said heating elements, preferably the cutting heads do not contact each other when the jaw members are in their second axial position.

Where the cutting head of the first jaw member is provided with said heating element, the cutting head of the second jaw member may be made of a heat resistant material, for example rubber or any other suitable heat resistant material. In this case, the first and second jaw members may be arranged such that they contact each other when they are in their second axial position.

The cutting head may be provided with a cutting surface, for cutting through wrapping material. The cutting surface may be a serrated surface.

The cutting head may be arranged such that as the first and second jaw members move from their first axial position to their second axial position, the cutting surfaces shear past each other.

At least one of the jaw members may be provided with a crimping head for crimping wrapping material extending between adjacent articles. Both of the jaw members may be provided with a said crimping head. Each crimping head may be provided with a crimping surface.

When the first and second jaw members are in their second axial position, their crimping heads may contact each other.

The crimping heads of the first and/or second jaw members may be provided with a heating element for crimping wrapping material by fusing it together.

The first and/or second jaw members may be provided with both a crimping head and a cutting head. In this case, the apparatus may be a cutting and crimping apparatus.

The jaw members may be arranged to cut or crimp wrapping material along a cutting or crimping plane respectively as they move from their first axial position to their second axial position.

When the jaw members are in their first and/or second rotational positions they may be arranged to move from their first axial position to their second axial position in a cutting or crimping plane. The plane may be substantially vertical.

When the jaw members are in their second axial position they may meet along a line that forms a cutting, or crimping, line respectively.

When the jaw members are in their second axial position they may be spaced apart, with a cutting, or crimping, line respectively formed along a line that extends substantially midway between opposed cutting or crimping surfaces of the heads of the jaw members.

The respective cutting, or crimping, line of the jaw members when the jaw members are in their first rotational position may be inclined relative to the cutting, or crimping, line when the jaw members are in their second rotational position.

When the jaw members are in their first rotational position the cutting, or crimping, line may be substantially horizontal and when the jaw members are in their second rotational position the cutting, or crimping, line may be substantially vertical, or vice-versa.

The frame may form a first frame, with the jaw members attached to a second frame that is rotatable relative to the first frame such that the jaw members are rotatable from their first rotational position to their second rotational position relative to the first frame.

Preferably one of the first and second frames is provided with at least one carrier member and the other of the first and second frames is provided with at least one guide member, wherein the second frame is rotatably mounted to the first frame by engagement of the at least one carrier member and guide member, with the at least one carrier member being movable along the at least one guide member so as to allow rotation of the second frame relative to the first frame from the first rotational position to the second rotational position.

Preferably the engagement of the carrier member and guide member substantially prevents translational movement of the second frame relative to the first frame, while allowing said rotation of the second frame relative to the first frame.

The carrier member may comprise a protrusion and the guide member may comprise a guide channel, within which the protrusion is slidably movable. The guide channel may be a slot, groove, or the like.

There may be a plurality of sets of engageable said carrier members and guide members.

Preferably the second frame is substantially arcuate. Preferably the second frame is substantially ring shaped. The guide member is preferably elongate and extends along a longitudinal axis that is substantially arcuate. The plurality of sets of guide members and carrier members may be distributed in the radial direction of the second frame. The plurality of sets of guide members and carrier members may be distributed in the circumferential direction of the second frame. Radially adjacent guide members may overlap in the circumferential direction of the second frame.

The cutting, or crimping, apparatus may be provided with at least one retaining member that is operable to selectively rotationally fix the second frame relative to the first frame. The at least one retaining member may be mounted to one of the first or second frames and arranged to selectively engage the other of the first or second frames so as to rotationally fix the second frame relative to the first frame. The at least one retaining member may be a plunger. The cutting, or crimping apparatus, may comprise a plurality of said retaining members. The retaining members may be distributed circumferentially relative to the second frame.

Where the opposed jaw members are mounted on said second frame, preferably one or both of the jaw members is/are movable relative to the second frame, such that the jaw members are movable from their first axial position to their second axial position.

The at least one jaw member may be connected to an actuator arranged to move the jaw members relative to each other from its first axial position to its second relative position. Both the jaw members may be so connected to an actuator. The actuator may be any suitable actuator, including an electric or pneumatic actuator.

The jaw members may be mountable on the frame in a plurality of positions such that position of the respective cutting, or crimping, line relative to the frame is varied. Preferably when the jaw members are in said plurality of positions on the frame the position of the cutting, or crimping, line is varied within said cutting, or crimping plane. Preferably where the jaw members move between their first and second axial positions in a substantially vertical plane, the jaw members are mountable on the frame in a plurality of vertical positions such that the vertical position of the cutting, or crimping, line is varied. In this case the cutting, or crimping, heads are preferably arranged such that the cutting, or crimping, line is substantially horizontal.

In this respect, the first frame may be slidably mounted on a third frame such that the jaw members are mountable on the third frame in a plurality of positions. Preferably one of the first and third frames is provided with at least one carrier member and the other of the first and third frames is provided with at least one guide member, wherein the first frame is mounted to the third frame by engagement of the at least one carrier member and guide member, with the carrier member being movable along the guide member so as to allow the jaw members to be mounted on the third frame in said plurality of positions.

This is advantageous in that allows the position of the cutting, or crimping, line to be varied as desired. For example, where the cutting, or crimping, line is oriented horizontally, it allows the height of the cutting, or crimping, line to be varied in dependence on the height of the articles, such that the cutting, or crimping, line is always positioned substantially midway along the height of the articles. This maintains a uniform distribution of tension in the packaging.

According to a second aspect of the invention there is provided a cutting, or crimping, assembly comprising a cutting, or crimping, apparatus according to the first aspect of the invention, an inlet conveyor for transporting wrapped articles towards the cutting, or crimping, apparatus and an outlet conveyor for transporting wrapped articles away from the cutting, or crimping, apparatus.

The inlet conveyor and outlet conveyor may be spaced apart, with the cutting, or crimping apparatus being disposed in the gap between the inlet conveyor and outlet conveyor so as to cut, or crimp, wrapping material between adjacent articles as they pass from the inlet conveyor to the outlet conveyor.

The inlet and outlet conveyors may be arranged to transport individual articles, or collations of articles, through the cutting, or crimping, apparatus along a conveyor longitudinal axis.

The cutting, or crimping, apparatus may be arranged such that the first and second jaw members are movable, and at least a portion of the inlet and outlet conveyors are movable such that the gap between them is movable with the first and second jaw members, in the direction of said conveyor longitudinal axis, as the first and second jaw members are moved relative to each other from the first axial position to the second axial position.

The inlet and outlet conveyors may each comprise a conveyor belt driven by a plurality of rollers, wherein a rear roller of the inlet conveyor and a front roller of the outlet conveyor, disposed on opposite sides of the gap, are movable in the direction of said conveyor longitudinal axis such that said gap is movable in the direction of said conveyor longitudinal axis.

The first and second jaw members and/or the rear roller of the inlet conveyor and the front roller of the outlet conveyor may be mounted on a carriage that is slidably mounted for movement in the direction of said conveyor longitudinal axis. The cutting, or crimping, assembly may comprise an actuator coupled to the carriage so as to drive the carriage in the direction of said conveyor longitudinal axis.

The at least one jaw member may be rotatably mounted to the frame such that it is rotatable from its first rotational position to its second rotational position about the conveyor longitudinal axis. In this case, the at least one jaw member may revolve about the longitudinal axis as it moves from its first rotational position to its second rotational position.

Preferably the jaw members and frame are arranged such that the jaw members are movable between their first and second axial positions in a plane that is substantially perpendicular to said longitudinal axis.

According to a third aspect of the invention there is provided a packaging apparatus comprising: a wrapping material applicator for wrapping an article, or a collation of articles in a wrapping material, an applicator inlet conveyor for transporting unwrapped articles towards the applicator; an applicator outlet conveyor for transporting wrapped articles away from the applicator; wherein the packaging apparatus further comprises a cutting, or crimping, assembly according to the second aspect of the invention arranged to respectively cut, or crimp wrapping material extending between adjacent articles, or collations of articles.

The applicator outlet conveyor may be arranged to transport wrapped articles away from the wrapping material applicator to the cutting, or crimping, apparatus. In this case, the applicator outlet conveyor may form the inlet conveyor of the cutting, or crimping, assembly The wrapping material applicator may be for helically wrapping articles.

The inlet and outlet applicator conveyors may be spaced apart, wherein the wrapping material applicator is disposed between said inlet and outlet applicator conveyors and which serves, in use, to pass the wrapping material between the spaced apart inlet and outlet applicator conveyors so as to wind it around and wrap one or more articles disposed in the space between the conveyors.

According to a fourth aspect of the invention there is provided a method of cutting, or crimping, wrapping material extending between adjacent articles, using a cutting, or crimping, apparatus according to the first aspect of the invention, comprising orienting the at least one jaw member in its first rotational position, moving the jaw members relative to each other from their first axial position to their second axial position so as to cut, or crimp wrapping material extending between adjacent articles, rotating the jaw members to their second rotational position and moving the jaw members relative to each other from their first axial position to their second axial position so as to cut, or crimp, wrapping material extending between adjacent articles.

Preferably the jaw members are moved relative to each other back from their second axial position to their first axial position.

The method may comprise moving the first and second jaw members, and at least a portion of the inlet and outlet conveyors are movable such that the gap between them is moved with the first and second jaw members, in the direction of the conveyor longitudinal axis, as the first and second jaw members are moved relative to each other from the first axial position to the second axial position.

According to a fifth aspect of the invention there is provided a method of packaging articles using a packaging apparatus according to the third aspect of the invention comprising: conveying unwrapped articles to the wrapping applicator; using the wrapping applicator to wrap an article or a collation of articles with wrapping material; conveying the wrapped articles or collations of articles from the applicator to the cutting, or crimping, apparatus, using the cutting, or crimping, apparatus to cut, or crimp, wrapping material by orienting the at least one jaw member in its first rotational position, moving the jaw members relative to each other from their first axial position to their second axial position so as to cut, or crimp wrapping material extending between adjacent articles, rotating the at least one jaw member to its second rotational position and moving the jaw members relative to each other from their first axial position to their second axial position so as to cut, or crimp, wrapping material extending between adjacent articles.

Preferably the jaw members are moved relative to each other back from their second axial position to their first axial position.

Any of the features of any of the above aspects of the invention may be combined.

Specific embodiments of the present invention will now be described, by way of example only, with reference to the accompanying drawings in which:

FIG. 3 is a front elevational view of a cutting apparatus of the cutting assembly shown in FIGS. 1 and 2 with a third frame of the cutting apparatus removed for illustrative purposes;

FIG. 4 is a side elevational view of the cutting apparatus shown in FIG. 3;

FIG. 5 is a plan view of the cutting apparatus shown in FIG. 3;

FIG. 6 is a perspective view of the cutting assembly shown in FIGS. 1 and 2, wherein the jaw members are in a second rotational position;

FIG. 8 is a front elevational view of a cutting apparatus of the cutting assembly shown in FIGS. 6 and 7 with a third frame of the cutting apparatus removed for illustrative purposes;

FIG. 9 is a side elevational view of the cutting apparatus shown in FIG. 8;

FIG. 10 is a plan view of the cutting apparatus shown in FIGS. 8 and 9;

FIG. 11 is perspective view of a packaging apparatus comprising the cutting apparatus shown in the preceding figures;

FIG. 12 is a side elevational view of the packaging apparatus shown in FIG. 11;

FIG. 14 is a front elevational view of the crimping apparatus shown in FIG. 13;

FIG. 15 is a side elevational view of the crimping apparatus shown in FIG. 13, and FIG. 16 is a plan view of the crimping apparatus shown in FIG. 13.

Figure 1:
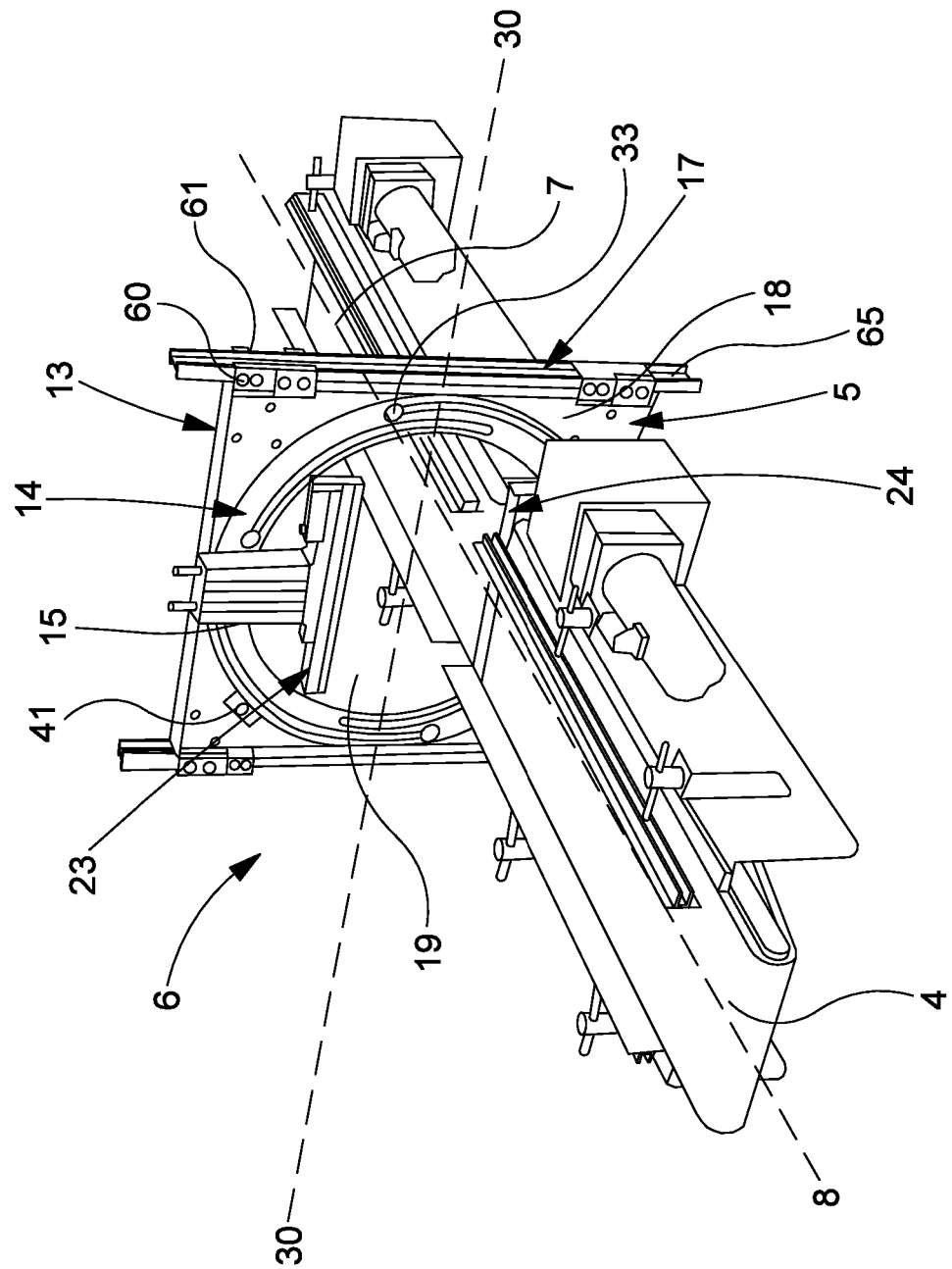
FIG. 1 is a perspective view of a cutting assembly according to the present invention, wherein jaw members of the cutting assembly are in a first rotational position.

Referring now to FIGS. 11 and 12 there is shown a packaging apparatus 1 in accordance with a third aspect of the present invention. The packaging apparatus 1 comprises an applicator inlet conveyor 2 arranged to transport unwrapped articles (A), in the form of substantially cylindrical cans, to a wrapping material applicator 3 and an applicator outlet conveyor 4 arranged to transport articles (A) wrapped by the applicator 3 from the applicator 3 to a cutting apparatus 5 according to a first aspect of the invention, of a cutting assembly 6 according to a second aspect of the invention.

The inlet and outlet applicator conveyors 2, 4 are substantially straight (when viewed from above) and have a common longitudinal axis 69 (see FIG. 11). They are of substantially the same width and are substantially vertically aligned with each other. The inlet and outlet applicator conveyors 2, 4 are spaced apart, in the direction of the common longitudinal axis 69 and the applicator 3 is disposed between them.

The articles on the applicator inlet conveyor 2 are arranged into separate collations of articles spaced apart in the longitudinal direction 69. The articles within each collation on the applicator inlet conveyor 2 are unsecured i.e. they are not secured together (e.g. by a tray) before they are wrapped by the applicator 3.

The wrapping material applicator 3 incorporates a rotary applicator ring 9. The applicator ring 9 rotates continuously about an axis that is substantially parallel to the common longitudinal axis 69 of the conveyors 2, 4 and dispenses wrapping material 12 from reels 11 disposed at angular intervals around a front face of the applicator ring 9. The reels 11 are attached to articles arriving on the outlet conveyor 4 by streams of wrapping material 12 which have just been wrapped around the articles. Thus, as the applicator ring 9 rotates, wrapping material 12 is pulled off the reels 11 and wrapped around articles following these articles, as they pass through the applicator ring 9.

The wrapping material 12 on each reel 11 is in the form of a continuous elongate web of thin, stretchable synthetic plastics film such as a polyurethane based material. The film is stretchable in the lateral direction, as well as in the longitudinal direction. As the articles pass through the ring 9, the wrapping material 12 is stretched and then wrapped in a helical fashion around the articles. The wrapping process continues as the articles progress along the inlet and outlet conveyors 2, 4 such that the wrapping material 12 continues to be wound in a helical fashion around successive upstream articles so as to produce a continuous wrap of articles. The wrapping material 12 is designed to recover from the stretching so that it shrinks tightly around the articles after wrapping.

Since the articles on the applicator inlet conveyor 2 are arranged into separate collations of articles spaced apart in the longitudinal direction 69, the wrapping material 12 is wrapped in a substantially continuous helical band around the gaps between successive collations of articles in the longitudinal direction 69.

Figure 2:
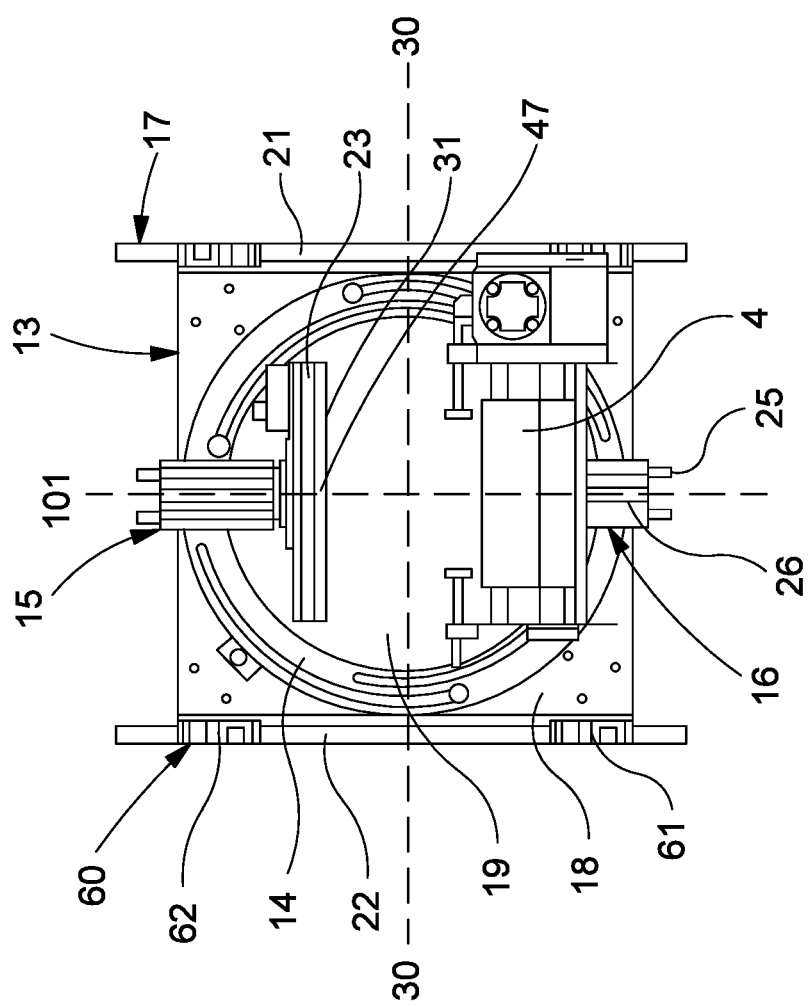
FIG. 2 is a front elevational view of the cutting assembly of FIG. 1.

Referring now to FIGS. 1 and 2 there is shown the cutting assembly 6 according to the second aspect of the present invention, wherein opposed first and second jaw members 23, 24 (see below) of the cutting assembly 6 are in a first rotational position.

The cutting assembly 6 comprises an inlet conveyor 4, formed by the applicator outlet conveyor, arranged to transport the wrapped articles (A) from the applicator 3 to a cutting apparatus 5 (of the cutting assembly 6) and an outlet conveyor 7 arranged to transport the articles, or collations of articles whose packaging has been cut by the cutting apparatus 5 to a discharge conveyor (not shown).

The inlet and outlet conveyors 4, 7 are substantially straight (when viewed from above) and have a common longitudinal axis 8. They are of substantially the same width and are substantially vertically aligned with each other. The inlet and outlet conveyors 4, 7 are spaced apart, in the direction of the common longitudinal axis 8 and the cutting apparatus 5 is disposed between them.

The cutting apparatus 5 comprises a first frame 13, a second frame 14 that is rotatably mounted to the first frame 13 and a pair of first and second jaw assemblies 15, 16 that are mounted to the second frame 14. The first frame 13 is mounted to a third frame 17 (as discussed in more detail below).

The third frame 17 comprises first and second elongate frame members 21, 22 (see FIG. 2) that are spaced apart in a lateral direction and extend along their length in a height direction. The first and second frame members 21, 22 are oriented such that their lengths extend substantially vertically.

The first frame 13 comprises a substantially planar and substantially square plate 18 provided with a central bore 19 that extends from a front face to a rear face of the plate 18. The plate 18 is oriented such that the plane of the plate is substantially perpendicular to the longitudinal direction 8. The bore 19 is defined by a radially inner surface of the plate 18 and has a radius that is substantially equal to half the width (or height) of the plate 18 minus the width of the second frame 14 in the radial direction. The bore 19 has a longitudinal axis that is substantially perpendicular to the plane of the plate 18. The longitudinal axis of the bore 19 is substantially parallel to the common longitudinal axis 8 of the inlet and outlet conveyors 4, 7.

Sides of the plate 18 that are opposed in the width direction of the plate 18 are mounted to the first and second frame members 21, 22 of the third frame 17 (as described in more detail below).

The second frame 14 is generally ring shaped and has a central longitudinal axis that is concentric with, and parallel to, the longitudinal axis of the bore 19 in the plate 18. The second frame 14 has a radially inner surface that has substantially the same diameter as the central bore 19 in the plate 18 and has a radially outer surface that has a diameter that is substantially equal to the width (or height) of the plate 18 of the first frame 13.

The first and second jaw assemblies 15, 16 are attached to the second frame 14 at opposed radial positions on the frame 14. Each jaw assembly 15, 16 comprises a jaw member 23, 24 connected to a pair of actuator rods 25 housed within a respective pair of pneumatic cylinders formed within a cylinder housing 26 (see FIG. 2). Each cylinder housing 26 is fixedly attached to the second frame 14. Each jaw member 23, 24 is provided with a cutting head 47 that is generally elongate and has a generally 'V-shaped' cross-sectional shape about its longitudinal axis. The apex of the 'V-shaped' cross-sectional shape forms a cutting surface 31. The cutting surfaces 31 of the cutting heads 47 are opposed to each other. Each cutting head 47 is provided with a heating element (not shown), which runs along the length of the cutting head 47.

The cutting surfaces 31 are substantially perpendicular to the axial direction 101 of movement of the jaw members 23, 24 (see below). The opposed cutting surfaces 31 of each jaw member 23, 24 are substantially parallel to each other. The opposed cutting surfaces 31 are substantially straight and are substantially aligned in the longitudinal direction 8, as well as in the lateral direction (which is a direction perpendicular to the longitudinal direction 8 and the height direction).

Each cutting surface 31 is elongate, extending in the lateral direction (when the jaw members 23, 24 are in their first rotational position).

Alternatively the cutting surfaces 31 may be serrated.

The actuator rods 25 are pneumatically driven within the pneumatic cylinders, by air supplied from a pneumatic pump (not shown), to form a pneumatic actuator, so as to move each jaw member 23, 24 towards the other, in an axial direction 101 (see FIG. 2). The axial direction 101 is in the radial direction of the second frame 14. When the first and second jaw members 23, 24 are in the first rotational position (see FIG. 2), the axial direction 101 is substantially vertical.

The pneumatic actuator is arranged to drivably move each jaw member 23, 24 in the axial direction 101 from a first axial position (shown in FIGS. 1 to 5 and 6 to 10) to a second axial position (not shown). In the first axial position the jaw members 23, 24, and their cutting surfaces 31, are spaced apart in the axial direction 101 so as to allow articles to pass between the jaw members 23, 24 from the inlet conveyor 4 to the outlet conveyor 7.

As the jaw members 23, 24 pass from the first axial position to the second axial position their cutting surfaces 31 cut through the wrapping material by melting of the wrapping material by the heating elements.

When the jaw members 23, 24 are in the second axial position their cutting heads 47 are spaced slightly apart in the axial direction 101. The cutting heads 47 define a cutting line 30 (see FIG. 1) which extends substantially midway between the cutting heads in the axial direction 101. This line 30 will be referred to as a cutting line 30.

Specifically, the cutting line 30 is a line which extends substantially midway between the cutting surfaces 31 in the axial direction 101.

The pneumatic actuator is also arranged to move the jaw members 23, 24 away from each other, in the axial direction 101 back from their second axial position to their first axial position (e.g. by suitable exhausting of air from the pneumatic cylinders). This allows subsequent articles to pass between the jaw members 23, 24.

The jaw members 23, 24 are movable between their first and second axial positions in a plane that is substantially perpendicular to the longitudinal direction 8, when the first and second jaw members 23, 24 are in both their first and second rotational positions (see below). The jaw members 23, 24 act to cut the wrapping material within this plane. In the orientation of the cutting apparatus 5 shown in the figures this plane is substantially vertical.

Since the cutting surfaces 31 of each cutting head 47 are substantially straight and substantially parallel, the cutting line 30 is substantially straight. The cutting surfaces 31 of the jaw members 23, 24 are arranged such that the cutting line 30 is substantially perpendicular to the longitudinal direction 8 when the first and second jaw members 23, 24 are in both the first and second rotational positions (see below).

The second frame 14 is rotatably mounted to the first frame 13 such that it is rotatable relative to the first frame 13 from a first rotational position as shown in FIGS. 1 to 5, to a second rotational position as shown in FIGS. 6 to 10, and vice versa. Since the first and second jaw assemblies are fixed to the second frame 14, they rotate with the second frame between respective first and second rotational positions relative to the first frame 13.

The second frame 14 (and so the first and second jaw members 23, 24) rotates from the first rotational position to the second rotational position about the central longitudinal axis of the second frame. In this respect, since this axis is external to the first and second jaw members, the first and second jaw members revolve about, i.e. orbit, the longitudinal axis as they move from their first rotational position to their second rotational position. As first and second jaw members 23, 24 move they do not rotate about an internal axis (an axis internal to the jaw members 23, 24), i.e. they do not spin.

In the first rotational position (as shown in FIGS. 1 to 5), the axial direction 101 in which the jaw members move from their first position to their second position, is substantially vertical. The jaw members 23, 24 are substantially horizontal and form a cutting line 30 that is substantially horizontal.

Figure 7:
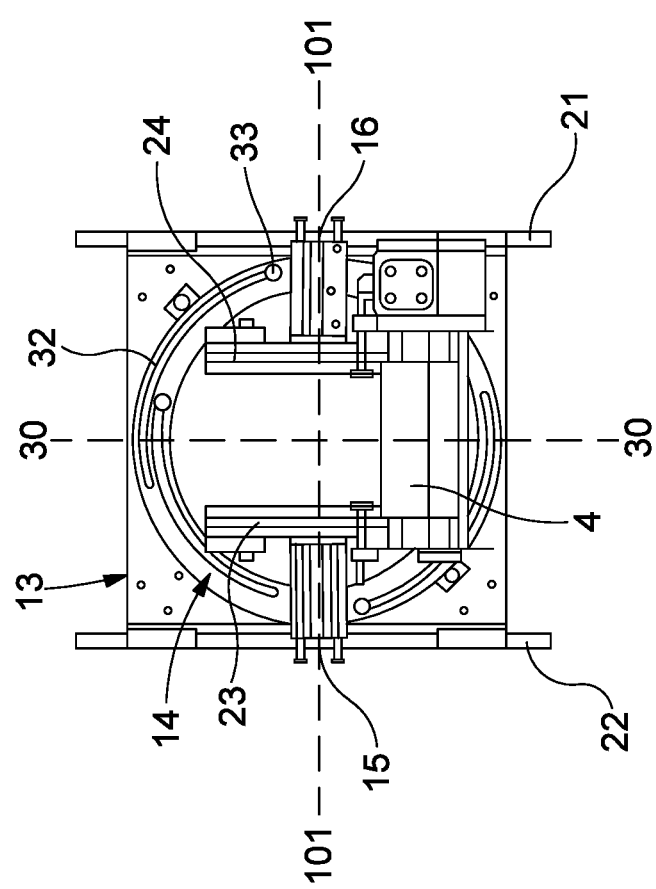
FIG. 7 is a front elevational view of the cutting assembly of FIG. 6.
Figure 13:
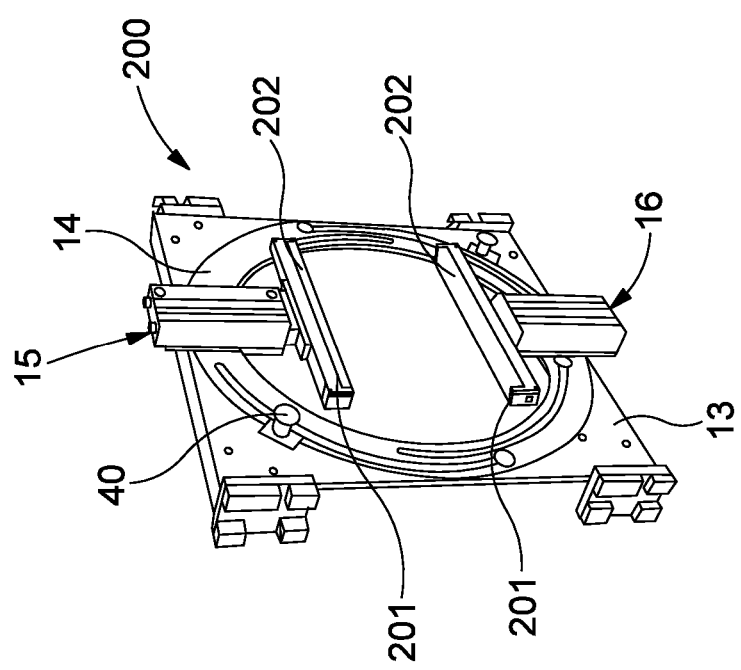
FIG. 13 is a front perspective view of a crimping apparatus that may be used in place of the cutting apparatus shown in the preceding figures, so as to form a crimping assembly, crimping apparatus and packaging apparatus comprising the crimping apparatus respectively.
Figure 17:
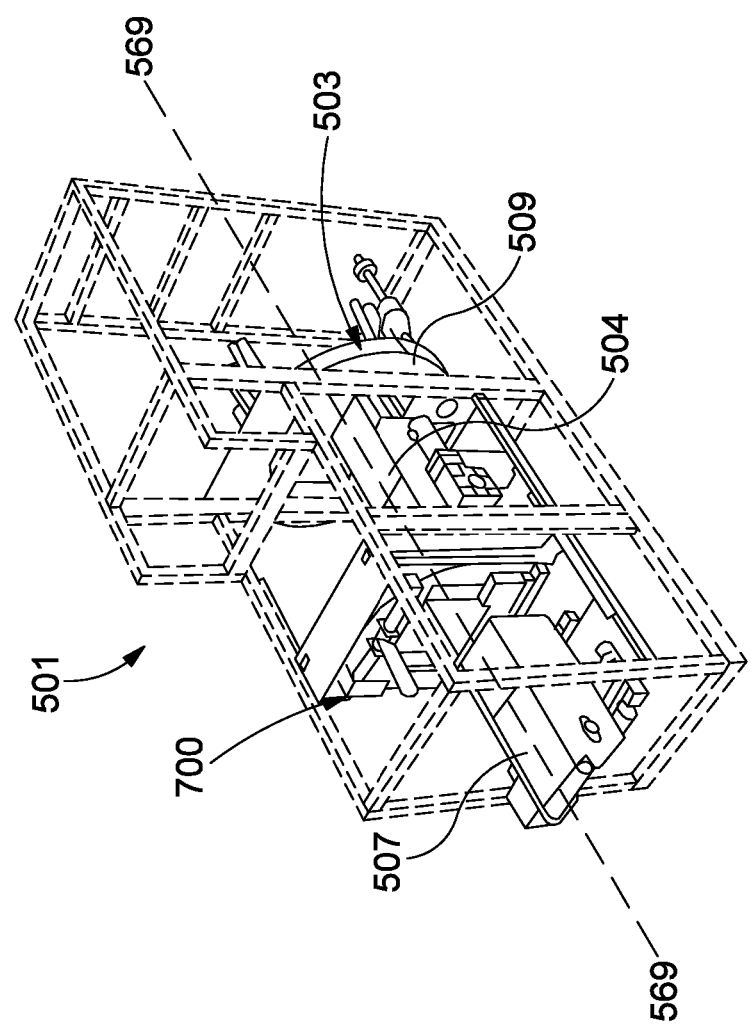
FIG. 17 shows a perspective view of a packaging apparatus comprising a second embodiment of the crimping assembly.

In the second rotational position (as shown in FIGS. 6 to 10), the axial direction 101 in which the jaw members move from their first position to their second position, is substantially horizontal (see FIG. 7). The jaw members 23, 24 are substantially vertical and form a cutting line 30 that is substantially vertical.

The second frame 14 is rotatably mounted to the first frame 13 by the engagement of a plurality of carrier and guide members, as will now be described.

The second frame 14 is provided with a plurality of guide members in the form of elongate slots 32 that extend in the circumferential direction of the second frame 14, part way along the circumference of the second frame 14, from a first end to a second end. Each slot 32 extends throughout the thickness of the second frame 14 from its front face to its rear face. Pairs of slots 32 on each side of the second frame 14 are spaced in the radial direction and partially overlap in the circumferential direction.

The first frame 13 is provided with a plurality of carrier members in the form of protrusions 33. Each protrusion 33 is generally mushroom shaped comprising a generally cylindrical shaft that extends from an inner end attached to the front face of the plate 18 of the first frame 13, in a direction substantially perpendicular to the plane of the plate 18 to an outer end of greater radius than the shaft to form a head.

Each protrusion 33 is slidably received within a corresponding slot 32. The shaft of each protrusion 33 extends through the slot 32, from the rear face to the front face of the second frame 14 with an inner surface of the head of the protrusion 33 abutting the front face of the second frame 14. The head of each protrusion 33 is wider than the slot that it is received in. Accordingly, the protrusions 33 substantially fix the second frame 14 in the longitudinal direction 8 relative to the first frame 13.

In the first rotational position each protrusion 33 is disposed at the first circumferential end of the respective slot 32. As the second plate 14 is rotated relative to the first plate 13, from the first rotational position to the second rotational position, each slot 32 is rotated relative to the first plate 13 until the second end of the slot reaches the respective protrusion 33. In this way, each protrusion 33 acts as a stop member as the second frame 14 rotates from its first rotational position to its second rotational position and back again. From the view shown in FIGS. 2 and 7, the second plate 14 is rotated relative to the first plate 13 in an anti-clockwise direction from the first rotational position to the second rotational position.

The second frame 14 is manually rotatable relative to the plate 18 between its first and second rotational positions. Alternatively, or additionally, the cutting apparatus 5 may be provided with an actuator (e.g. a pneumatic or electric actuator) that is mechanically connected to the second frame 14 so as to rotate the second frame 14 relative to the first frame 13.

The second frame 14 is provided with a plurality of collars 43 (see FIG. 3) distributed circumferentially around the radially outer periphery of the second frame 14. Each collar 43 is integrally formed with the second frame 14 and projects radially outwardly from the radially outer surface of the second frame 14. Each collar is provided with a circular bore which receives a retaining plunger 40. Each retaining plunger 40 is free to rotate within its collar 43.

Each retaining plunger 40 comprises a threaded shaft that extends from a first end proximal the front surface of the respective collar 43 to a second end, distal to the front surface of the respective collar 43. The first end is provided with a head of greater diameter than the shaft and of greater diameter than the aperture in the collar 43, such that the retaining plunger 40 is axially retained within the collar 43.

The plate 18 is provided with a plurality of bores 41 distributed circumferentially around the radially outer periphery of the second frame 14 (see FIG. 3). Each bore has a complementary thread to that of the shaft of the plunger 40. The plungers 40 and bores 41 are arranged such that when the second frame 14 is in its first and second rotational positions, each plunger 40 is aligned with a respective bore 41.

The threaded shaft of each plunger 40 is screwedly engageable within each bore 41 so as to move the head of the plunger 40 between a first position and a second position. In the first position the head of the plunger 40 is positioned such that it does not clamp the second frame 14 against the front face of the plate 18. This allows the second frame 14 to rotate relative to the plate 18.

When the retaining plunger 40 is move to its second position, the inner face of the head of the plunger 40 is moved towards the front face of the plate 18. When the plunger 40 reaches its second position, the second frame 14 is clamped between said inner face of the head of the plunger 40 and the front face of the plate 18. This acts to rotationally fix the second frame 14 relative to the plate 18.

Accordingly the retaining plungers 40 and bores 41 are arranged to selectively prevent and allow rotation of the second frame 14 relative to the first frame 13 in the first and second rotational positions. It will be appreciated that additional plungers 40 and bores 41 may be used such that the second frame 14 may be rotationally fixed relative to the first frame in additional rotational positions, e.g. rotational positions between the first and second rotational positions.

The jaw assemblies 15, 16 and the first, second and third frames 13, 14, 17 are arranged such that the jaw members 23, 24 may be mounted on the third frame 17 in a plurality of vertical positions on the frame 17 so as to vary the vertical position of the cutting line 30, i.e. so as to vary the position of the cutting line 30 within the plane in which the jaw members 23, 24 are movable between their first and second axial positions. In this respect, the sides of the plate 18 that are opposed in the width direction of the plate 18 are each provided with a pair of roller carriages 60, disposed at upper and lower ends of the sides. Each roller carriage 60 comprises a housing 62 that is fixedly attached to the plate 18 and a pair of rollers 61 that are rotationally mounted to the housing 62. Each of the first and second frame members 21, 22 of the third frame 17 is provided with an elongate guide channel 65, for receiving the rollers of a respective pair of carriages 60. The carriages 60 and the guide channels 65 are arranged such that the plate 18 is vertically slidable along the length of the first and second frame members 21, 22.

This is advantageous in that it allows the height of the cutting line 30 to be varied within said plane. This allows the height of the cutting line 30 to be varied, in dependence on the height of the articles, such that the cutting line 30 is always positioned substantially midway along the height of the articles. This maintains a uniform distribution of tension in the packaging.

In operation, the articles wrapped by the applicator 3 are passed from the applicator 3 to the cutting apparatus 5 by the inlet conveyor 4. As stated above, the wrapping material extends around the longitudinal gaps between spaced collations of articles. The jaw members 23, 24 are initially in their first rotational position and are in their first axial position (as shown in FIG. 2). As the gap between adjacent articles passes the jaw members 23, 24, the pneumatic actuator is operated so as to move both jaw members 23, 24 towards each other, so as to move the jaw members 23, 24 from their first axial position to their second axial position (in the direction of axis 101). As the jaw members reach their second axial position, the cutting surfaces 31 of the jaw members 23, 24 cut wrapping material extending between the adjacent collations, as described above. The pneumatic actuator is then operated to move the jaw members 23, 24 back to their first axial position, which allows for the next upstream collations to pass between the jaw members 23, 24. The process is then repeated so as to cut wrapping material extending between the next pair of adjacent collations.

The second frame 14, and the first and second jaw members 23, 24, are initially oriented in their first rotational positions (as shown in FIGS. 1 to 5).

In the first rotational position (as shown in FIGS. 1 to 5), the axial direction 101 in which the jaw members move from their first position to their second position, is substantially vertical. The jaw members 23, 24 are substantially horizontal and form a cutting line 30 that is substantially horizontal. In this position, the protrusions 33 are each received at the first ends of the respective slots 32.

If it is desired to change the orientation of the axial direction 101, for example due to a change in dimension of the articles, then the cutting jaw members 23, 24 are moved from the first rotational position to the second rotational position, as will now be described. Firstly, the retaining plungers 40 are unscrewed from their second position to their first position, so as to permit rotational movement of the second frame 14 relative to the plate 13. The second frame 14 is then rotated, either manually or by an appropriate actuator, from the first rotational position to the second rotational position. As it does so, the slots 32 are rotated until the second end of the slot 32 reaches the respective protrusion 33.

In the second rotational position (as shown in FIGS. 6 to 10), the axial direction 101 in which the jaw members move from their first position to their second position, is substantially horizontal (see FIG. 7). The jaw members 23, 24 are substantially vertical and form a cutting line 30 that is substantially vertical.

The jaw members 23, 24 may be moved back from the second rotational position to the first rotational position, as desired, by following the reverse procedure.

Referring now to FIGS. 13 to 16 there is shown a crimping apparatus 200 according to the first aspect of the invention. The crimping apparatus 200 is substantially the same, and works in substantially the same way, as the cutting apparatus 5 shown in FIGS. 1 to 12, except in that the cutting heads 47 of the jaw members 23, 24 are replaced with crimping heads 201 which act to crimp the wrapping material (as well as cutting it). The same reference numerals are used in FIGS. 13 to 16, as in the preceding figures, so as to show the corresponding features.

Each crimping head 201 is generally elongate and is provided with a generally flat crimping surface 202. The crimping surfaces 202 of each crimping head 201 are opposed to each other. The crimping surfaces 202 are substantially perpendicular to the axial direction 101 of movement of the jaw members 23, 24.

The opposed crimping surfaces 202 of each jaw member 23, 24 are substantially parallel to each other. The opposed crimping surfaces 202 are substantially straight and are substantially aligned in the longitudinal direction 8, as well as in the lateral direction (which is a direction perpendicular to the longitudinal direction 8 and the height direction). Each crimping head 201 is provided with a heating element (not shown), which runs along the length of the crimping head 201.

As with the cutting apparatus 5, the pneumatic actuator is arranged to drivably move the jaw members 23, 24 towards each other in the axial direction 101 from a first axial position (shown in FIGS. 13 and 14) to a second axial position. In the first axial position the jaw members 23, 24 are spaced apart in the axial direction 101 so as to allow articles to pass between the jaw members 23, 24 from the inlet conveyor 4 to the outlet conveyor.

As the jaw members move from their first axial position to their second axial position, their crimping surfaces 202 compress together the upper and lower sections of wrapping material extending between adjacent articles. In the second axial position the crimping surfaces of the crimping heads abut each other along a line 50 (see FIG. 14), which will be referred to as a crimping line 50. The heating elements on the crimping surfaces 202 act to fuse the wrapping material together as the crimping surfaces compress the wrapping material together. This acts to both crimp and cut the wrapping material extending between adjacent articles.

It will be appreciated that the crimping apparatus 200 otherwise functions in the same way as the cutting apparatus 5. For example, the jaw members 23, 24 are rotatable between their first and second rotational positions (with the first rotational position shown in FIGS. 13 and 14), in the same way as for the cutting apparatus 5, so as to vary the axial direction 101 in which the jaw members 23, 24 are moved between their first and second axial positions.

The jaw members 23, 24 are movable between their first and second axial positions in a plane that is substantially perpendicular to the longitudinal direction 8, when the first and second jaw members 23, 24 are in both their first and second rotational positions (see below). The jaw members 23, 24 act to crimp the wrapping material within this plane.

The crimping line 50 is directly analogous to the cutting line 30 of the cutting apparatus 5 and references to the crimping line 50 and how it may be rotated between a first position and a second position, by rotation of the second frame 14 relative to the first frame 13, are to be construed accordingly.

In addition, the jaw assemblies 15, 16 and the first, second and third frames 13, 14, 17 are arranged such that the jaw members 23, 24 may be mounted on the third frame 17 in a plurality of vertical positions on the frame 17 so as to vary the vertical position of the crimping line 50.

It will be appreciated that the crimping apparatus 200 may be substituted for the cutting apparatus 5 in the assembly of FIGS. 1 and 2 (and FIGS. 6 and 7), so as to form a crimping assembly. Similarly, it will be appreciated that the crimping apparatus 200 may be substituted for the cutting apparatus 5 in the packaging apparatus of FIGS. 11 and 12.

The above described arrangement is advantageous in that the jaw members 23, 24 of the cutting and crimping assemblies may be rotated between their first and second positions, so as to vary their axial direction of movement between their first and second axial positions, depending on the relative dimensions of the articles passing to the cutting, or crimping apparatus.

For example, if the articles carried on a conveyor to the cutting or crimping apparatus are relatively tall and narrow, it is preferable that the axial direction of movement of the jaw members 23, 24 is substantially horizontal. Conversely, if the articles are relatively short and wide it is preferable that the axial direction of movement of the jaw members 23, 24 is substantially vertical. Orienting the axial direction of movement of the jaw members 23, 24 in this manner is advantageous in that it shortens the distance that the jaw members 23, 24 need to travel in order to cut, or crimp, wrapping material extending between adjacent articles, thereby reducing the length of wrapping material that the jaw members need to cut or crimp through. In this respect, the length of wrapping material that each point on the jaw member has to cut or crimp through is reduced. This reduces the energy that is lost as heat during the cutting or crimping, thereby resulting in a more efficient cutting or crimping, apparatus.

In addition, this change of orientation may be done quickly and easily. In this respect, it is not necessary to remove a cutting, or crimping, apparatus that has a first (e.g. horizontal or vertical) orientation of said axial direction of movement of the jaw members 23, 24 and to replace it with a separate cutting, or crimping, apparatus that has a second (e.g. vertical or horizontal) orientation of said axial direction. This therefore saves time and cost. In this respect, since the productivity of a production line apparatus is highly dependent on the number of articles that are wrapped per unit time, any stoppages in a production line result in a significant economic loss. In addition, costs are saved as it is not necessary to providing separate cutting or crimping apparatus with different jaw orientations and as it is not necessary to employ skilled personnel in order to change the cutting, or crimping, apparatus.

In addition, the height at which the jaw members meet each other, i.e. the height of the cutting, or crimping, line may be varied quickly and easily. This allows the height of cutting, or crimping, line to be varied, in dependence on the height of the articles, such that the cutting, or crimping, line is always positioned substantially midway along the height of the articles. This maintains a uniform distribution of tension in the packaging.

Referring to FIGS. 17 to 22 there is shown a packaging apparatus 501 according to a further embodiment of the invention. The packaging apparatus 501 is identical to the packaging apparatus 1 shown in FIG. 11 when comprising the crimping assembly shown in FIGS. 13 to 15, except for the differences described below. Features of the packaging apparatus 501 that correspond to features of the packaging apparatus shown in FIGS. 11 and 12 and that correspond to features of the crimping assembly shown in FIGS. 13 to 16 are given corresponding reference numerals, but incremented by 500.

Figure 18:
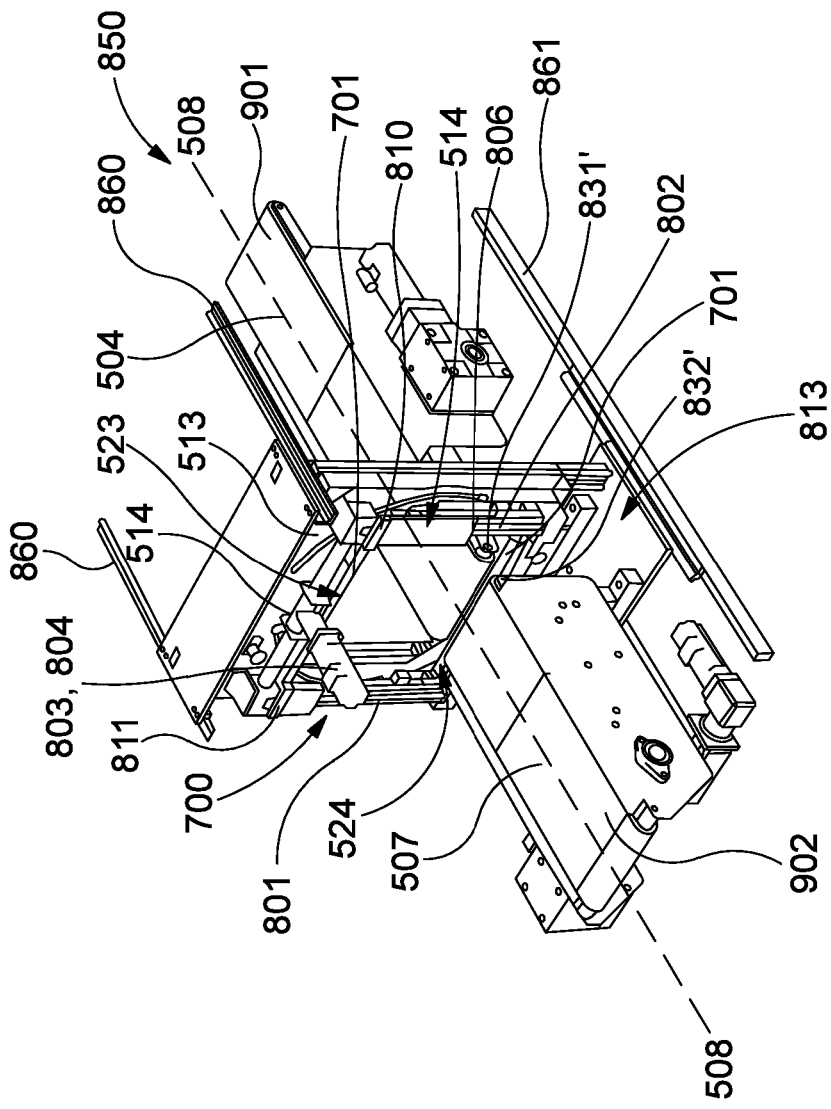
FIG. 18 shows a front perspective view of the second embodiment of the crimping assembly of the packaging apparatus shown in FIG. 17.
Figure 19:
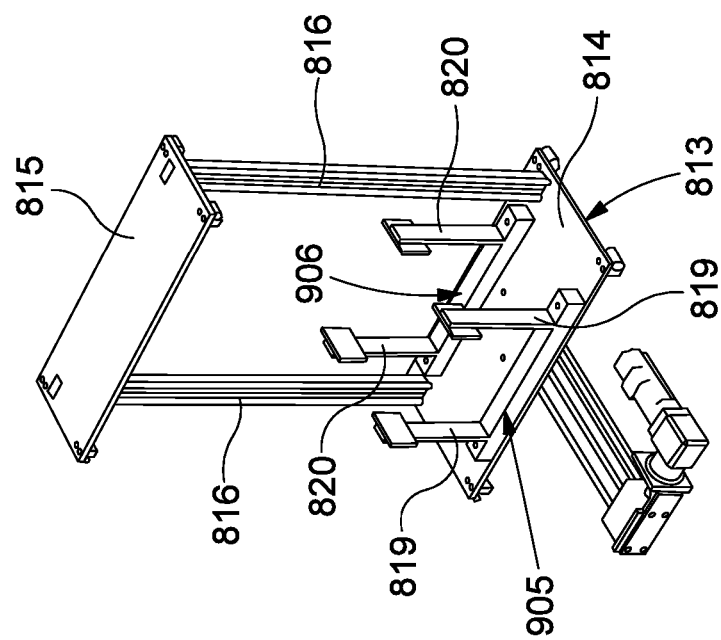
FIG. 19 shows a perspective view of a carriage of the crimping assembly shown in FIG. 18.

The crimping assembly 850 shown in FIG. 18 differs from that shown in FIGS. 13 to 16 in how the jaw members 523, 524 (and therefore their crimping heads 701) are moved from the first axial position to the second axial position. In this regard, each jaw member 523, 524 is provided, at either end of the jaw member 523, 524, with a collar 810, 811. The collars 810, 811 are coupled to an actuator in the form of a servomotor 803 by first and second linear belt drives 801, 802. A transmission is disposed between the linear belt drives 801, 802 and the servomotor 803.

Each collar 810, 811 is slidably mounted on a respective linear guide member 806 (the second linear guide member is omitted from FIG. 18 for illustrative purposes).

Rotation of the servomotor 803 drives the linear belt drives 801, 802 which moves the jaw members 523, 524 (and therefore the crimping heads 701) towards and away from each other between the first and second axial positions.

Alternatively, the means of moving the jaw member 523, 524 between their first and second axial positions may be that of any of the preceding embodiments.

In this embodiment, the first and second jaw members 523, 524, the linear drive belts 801, 802 and the servomotor 803 are each mounted on the second frame 514. The second frame 514 is rotatably mounted on the first frame 513 as with the preceding embodiment.

In this embodiment, the crimping apparatus 700 and the gap between the inlet and outlet conveyors 4, 7 are arranged to move in the conveyor axial direction 508 so as to move axially with the articles on the conveyor as the packaging between the articles is crimped by the crimping heads 701, i.e. as the jaw members 523, 524 move between the first and second axial positions.

In more detail, the crimping assembly 850 further comprises a carriage 813. The carriage 813 comprises substantially horizontal upper and lower plates 814, 815 (see FIG. 19) attached to each other by a pair of substantially vertical struts 816 that are disposed at laterally opposite sides of a front end of the plates 814, 815 and extend between opposed surfaces of the plates 814, 815.

The crimping apparatus 700 is mounted on the carriage 813 between the upper and lower plates 814, 815. In this regard, the crimping apparatus 700 is fixably attached to the carriage 813 such that it moves axially with the carriage 813 (as described below).

Figure 22:
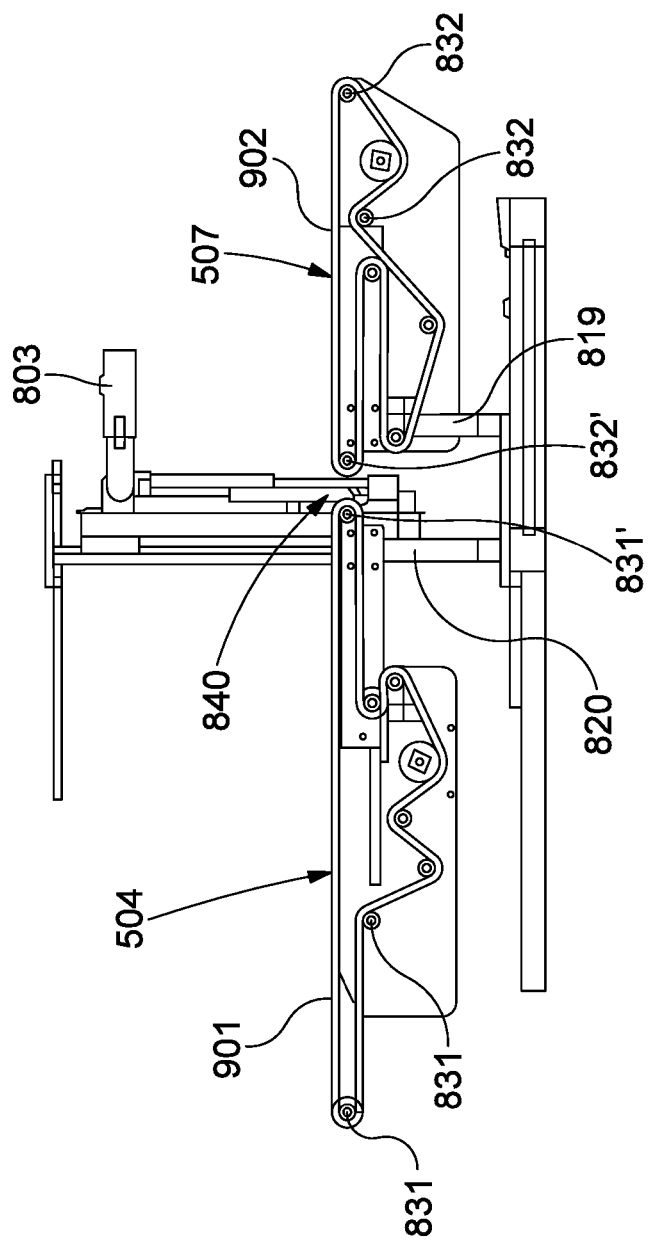
FIG. 22 shows an axial cross-sectional view of the crimping assembly shown in FIG. 18.

Each of the inlet and outlet conveyors 504, 507 comprises a respective conveyor belt 901, 902 that passes around a plurality of conveyor rollers 831, 832 (see FIG. 22). The rotation of the conveyor rollers 831, 832 drives the conveyor belts 901, 902. The rear roller 831' of the inlet conveyor 504 and the front roller 832' of the outlet conveyor 507 are disposed on opposite axial sides of the gap 840 between the conveyors 504, 507, in which the crimping apparatus 700 is located.

The carriage 813 is provided with first and second pairs of roller attachment assemblies 905, 906. Each conveyor roller attachment assembly 905, 906 comprises a pair of laterally spaced substantially vertical roller attachment members 819, 820.

The roller attachment members 819 of the first roller attachment assembly 905 are attached to laterally opposite ends of the front roller 832' of the outlet conveyor 507.

Similarly, the first and second roller attachment members 820 of the second roller attachment assembly 906 are attached to laterally opposite ends of the rear roller 831' of the inlet conveyor 504.

The roller attachment assemblies 905, 906 are fixably attached to the lower plate 814 of the carriage 813, so as to move axially with the carriage 813.

The carriage 813 is slidably mounted, for movement in the axial direction 508 (in both the forward and backwards directions), on upper and lower pairs of guide rails 860, 861. The carriage 813 is moved in the axial direction by a linear drive belt that is driven by a servomotor (not shown).

As the carriage 813 moves in the axial direction 508, the cutting apparatus 700 moves in the axial direction 508 by virtue of its mounting on the carriage. Similarly, the conveyor rollers 831', 832' are moved by the respective conveyor roller assemblies 905, 906 in the axial direction 508, with the crimping apparatus 700. In this way, the gap 840 between the inlet and outlet conveyors 504, 507 moves in the axial direction 508 with the jaw members 523, 524 (and therefore the crimping heads 701).

Figure 20:
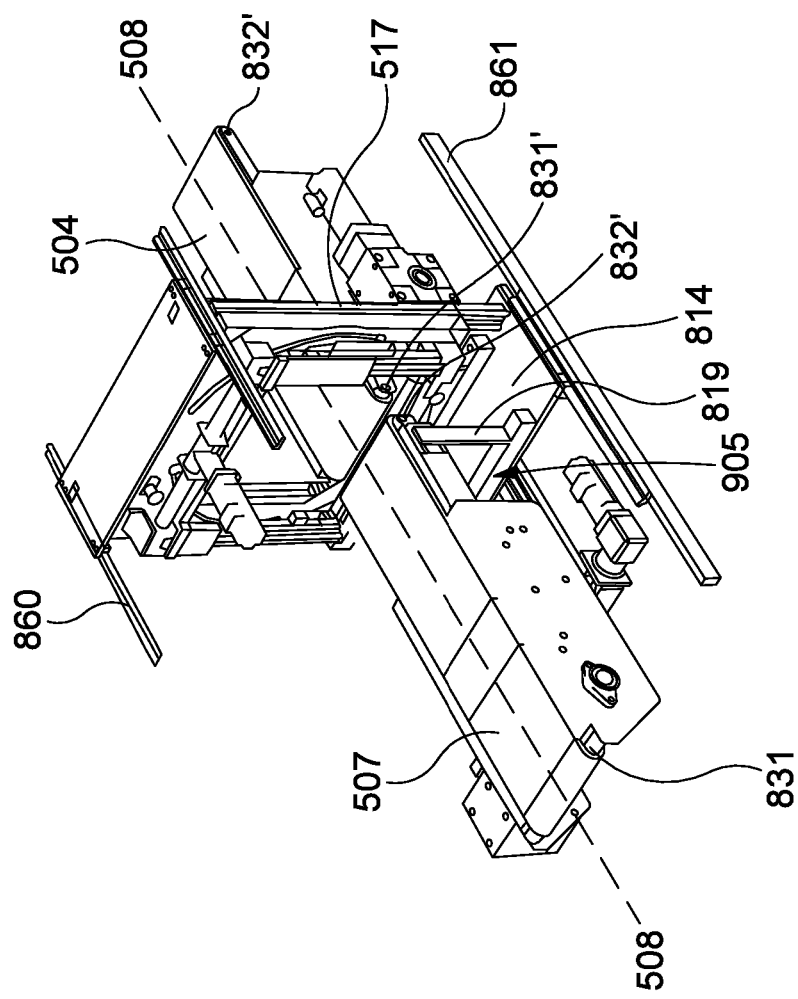
FIG. 20 shows a view corresponding to that of FIG. 18, but wherein the crimping apparatus and the inlet and outlet conveyors of the crimping assembly are in a first axial position.
Figure 21:
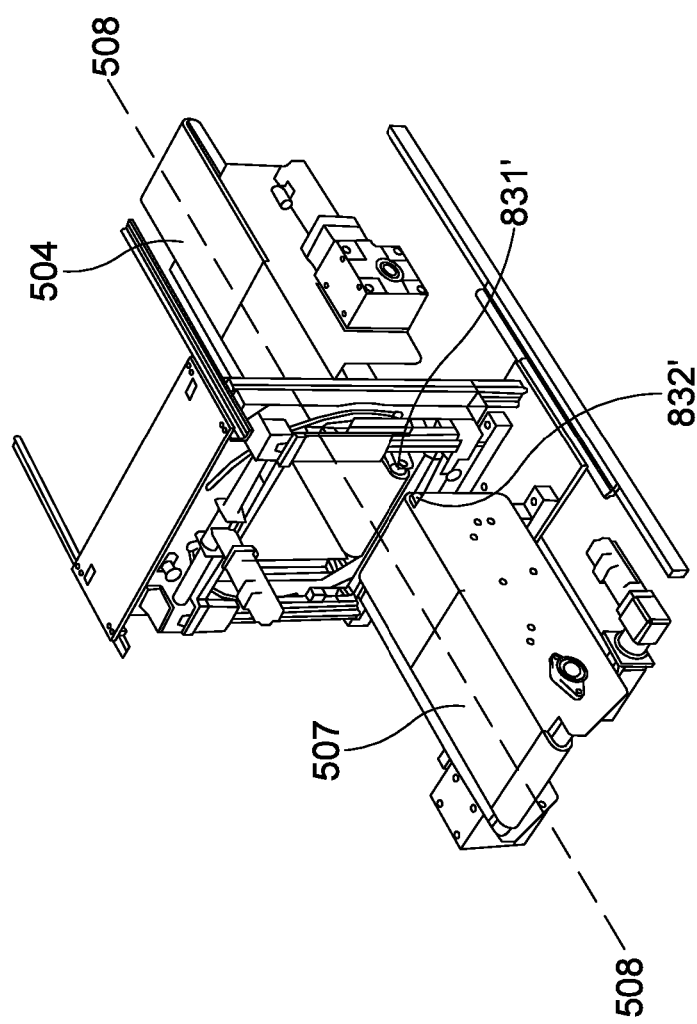
FIG. 21 shows a view corresponding to that of FIG. 20, but wherein the crimping apparatus and the inlet and outlet conveyors of the crimping assembly are in a second axial position.

In this regard, FIGS. 20 and 21 show where the crimping apparatus 700 and the inlet and outlet conveyors 504, 507 are in first and second axial positions (along the axis 508) respectively. The second axial position is forward of the first axial position, in the direction of movement of articles on the conveyors 504, 507.

This allows the jaw members 523, 524 and the gap 840 to move axially with the articles on the conveyors 504, 507 as the packaging between the articles is crimped by the crimping heads 701, i.e. as the jaw members 523, 524 are moved between the first and second axial positions, with the jaw members 523, 524 passing through the gap 840 between the inlet and outlet conveyors 504, 507 as they do so.

This is advantageous in that it enables the packaging between articles to be crimped without having to start and stop the inlet and outlet conveyors 504, 507. In addition, it allows the speed of movement of the jaw members 523, 524, as they move from their first to their second axial position, to be decreased.

Furthermore, the use of the servomotor 803 and the linear belt drives 801, 802 allows for greater flexibility in setting the gap between the jaw members 523, 524 in the second axial position. The servomotor 803 can also control the movement of the jaw members 523, 524 from their first axial position to their second axial position, and vice-versa, with a high degree of precision. It is also possible to programme various setups for multi pack size machines.

In the described embodiment both the first and second jaw members 523, 524 move axially as the jaw members 523, 524 move from their first axial position to their second axial position. Alternatively, one of the jaw members may be fixed (in the direction of said movement from the first axial position to the second axial position) with the other jaw member being moved from the first axial position to the second axial position. Preferably, the second jaw member 524 is fixed in this way, with the first jaw member 523 being movable from the first axial position to the second axial position.

As with the preceding embodiments, the second frame 514 is vertically slidably mounted on a third frame 517 so as to vary the vertical position of the crimping line.

It will be appreciated that the cutting or crimping apparatus of the preceding embodiments may be used in place of the crimping apparatus 700 of this embodiment.

It will be appreciated that numerous modifications to the above described design may be made without departing from the scope of the invention as defined in the appended claims.

For example, in the described embodiments both the first and second jaw members 23, 24 are movable in the axial direction 101, by the pneumatic actuator, so as to move the jaw members 23, 24 between said first and second relative axial positions. Alternatively, only one of the jaw members 23, 24 may be movable between a first and second axial position, with the other jaw member being stationary.

In the described embodiment both the first and second jaw members 23, 24 are rotatable from the first rotation position to the second rotational position. Alternatively, only one of the jaw members 23, 24 may be rotatable between the first and second rotational positions, with the other jaw member being stationary. In this respect, each jaw member 23, 24 may have curved cutting/crimping surfaces that circumferentially overlap when the jaw members 23, 24 are in both their first and second rotational positions. The jaw members 23, 24 may translate relative to the frame as they rotate from their first rotational position to their second rotational position. However, it is preferable that they do not translate as they rotate from their first rotational position to their second rotational position.

In the described embodiments when the jaw members 23, 24 are in their first rotational position, the axial direction 101 in which the jaw members move from their first axial position to their second axial position, is substantially vertical. When the jaw members 23, 24 are in the second rotational position, the axial direction 101 in which the jaw members move from their first axial position to their second axial position, is substantially horizontal. However, it will be appreciated that when the jaw members 23, 24 are in the first and second rotational positions, the respective axial directions 101 may have different orientations, i.e. orientations that are not substantially horizontal or vertical.

Similarly, in the described embodiment when the second frame 14 is in the first rotational position, the cutting/crimping surfaces 31, 202 of the jaw members 23, 24 are oriented such that the cutting/crimping line 30, 50 is substantially horizontal and in the second rotational position, the cutting/crimping surfaces 31, 202 of the jaw members 23, 24 are oriented such that the cutting/crimping line 30, 50 is substantially vertical. However, it will be appreciated that when the second frame 14 is in the first and second rotational positions the cutting/crimping surfaces 31, 202 of members 23, 24 may be oriented such that the cutting/crimping line 30, 50 has different orientations, i.e. orientations that are not substantially horizontal or vertical.

In the described embodiment the crimping/cutting surfaces 31, 202 of the jaw members 23, 24 are substantially straight, which produces a cutting/crimping line 30, 50 that is substantially straight. However, it will be appreciated that the cutting/crimping surfaces 31, 202 may not be substantially straight, for example they may be curved, or serrated in the longitudinal direction of the surface to produce a cutting/crimping line 30, 50 that has a corresponding shape, e.g. curved or serrated in the longitudinal direction. Similarly, in the described embodiment the cutting/crimping surfaces 31, 202 are substantially perpendicular to the longitudinal direction 8. Alternatively, the cutting/crimping surfaces 31, 202 may be oriented such that the cutting/ crimping line 30, 50 is inclined relative to the direction that is substantially perpendicular to the longitudinal axis 8.

In the described embodiment the crimping apparatus both cuts and crimps the wrapping material. Alternatively it may be arranged to only crimp the wrapping material.

In the described embodiment the cutting heads do not meet when the jaw members 23, 24 are in the second axial position. Alternatively, they may meet, i.e. abut, when the jaw members 23, 24 are in the second axial position. In this case, the first cutting head may comprise a heating element and the second cutting head may be formed of a suitable heat resistant material, e.g. rubber. It will also be appreciated that the cutting and crimping heads may take any suitable shape.

In the described embodiment the crimping and cutting surfaces of the crimping and cutting heads are substantially perpendicular to the axial direction 101 of the jaw members 23, 24. Alternatively, the crimping and cutting surfaces may be inclined relative to a direction substantially perpendicular to the axial direction 101 of the jaw members 23, 24.

In the described embodiment the packaging apparatus is shown in its typical orientation in use, where the inlet and outlet conveyors 4, 7 of the cutting/crimping assemblies are substantially horizontal and the first and second frame members 21, 22 of the third frame 17 are oriented such that their lengths extend substantially vertically. However, it will be appreciated that the inlet and outlet conveyors 4, 7 and the first and second frame members 21, 22 of the third frame 17 may be oriented differently, as desired.

In the described embodiment the actuator is a pneumatic actuator. However, it will be appreciated that any suitable actuator may be used, including an electric actuator, an electro-magnetic actuator, etc.

In the described embodiments of the invention, the inlet and outlet conveyors 2, 4 are substantially straight. However, it will be appreciated that the inlet and/or outlet conveyors 2, 4 may be curved (when viewed from above). In this case, the respective longitudinal axes of the inlet and/or outlet conveyors 2, 4 will be curved. It is not necessary that the inlet and outlet conveyors 2, 4 have a common longitudinal axis. In addition, the inlet and outlet conveyors 2, 4 may not be substantially vertically aligned (although this is preferable) and may be of different widths.

In the described embodiment the retaining plungers are mounted to the second frame 14. Alternatively, the retaining plungers 40 may be mounted to the first frame 13 and be selectively moveable to engage the second frame 14 so as to clamp the second frame 14 between said inner face of the head of the plunger 40 and the front face of the plate 18. This acts to selectively rotationally fix the second frame 14 relative to the plate 18. In the described embodiment, the roller carriages 60 are mounted on the plate 18 and the guide channels 65 are mounted on the third frame 17. Alternatively, the roller carriages 60 may be mounted on the third frame 17, with the guide channels 65 mounted on the plate 18. Furthermore, it will be appreciated that any suitable guide arrangement may be used that allows the jaw members to be mounted on the third frame 17 in a plurality of vertical positions on the frame 17 so as to vary the vertical position of the cutting or crimping line.

In the described embodiment the articles are substantially cylindrical cans. However, it will be appreciated that the articles may take different shapes and sizes and could be any type of article to be wrapped.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A cutting, or crimping, assembly comprising:
a cutting, or crimping, apparatus;
an inlet conveyor for transporting wrapped articles towards the cutting, or crimping, apparatus; and
an outlet conveyor for transporting wrapped articles away from the cutting, or crimping, apparatus
wherein the cutting, or crimping, apparatus comprises first and second opposed jaw members which are mounted on a frame and are movable relative to each other from a first axial position to a second axial position along an axis so as to respectively cut, or crimp, wrapping material extending between adjacent articles wherein at least one of the jaw members is rotatably mounted to the frame such that it is rotatable from a first rotational position to a second rotational position, in the first rotational position the jaw members are movable relative to each other along a first said axis and in the second rotational position the jaw members are movable relative to each other along a second said axis that is inclined relative to the first axis; and
wherein the inlet and outlet conveyors are arranged to transport individual articles, or collations of articles, through the cutting, or crimping, apparatus along a longitudinal axis and the at least one jaw member is rotatably mounted to the frame such that it is rotatable from its first rotational position to its second rotational position about the longitudinal axis, wherein the frame forms a first frame, with the jaw members attached to a second frame that is substantially ring-shaped and rotatable relative to the first frame such that the jaw members are rotatable from their first rotational position to their second rotational position relative to the first frame.

2. A cutting, or crimping, assembly according to claim 1 wherein the at least one jaw member rotates from its first rotational position to its second rotational position about an external rotational axis.

3. A cutting, or crimping, assembly according to claim 1 wherein the at least one jaw member is both of the jaw members.

4. A cutting, or crimping, assembly according claim 1 wherein at least one of the jaw members is provided with a cutting or crimping head for cutting through or crimping wrapping material extending between adjacent articles.

5. A cutting, or crimping, assembly according to claim 4 wherein the first and second jaw members are both provided with a cutting or crimping head, and wherein the first and second jaw members are arranged such that when they are in their second axial position, their cutting, or crimping, heads do not contact each other.

6. A cutting, or crimping, assembly according to claim 4 wherein the first and second jaw members are both provided with a cutting or crimping head, and wherein the first and second jaw members are arranged such that when they are in their second axial position, their cutting, or crimping, heads contact each other.

7. A cutting, or crimping, assembly according to claim 1 wherein the jaw members are arranged to cut or crimp wrapping material along a cutting or crimping plane respectively, as they move from their first axial position to their second axial position.

8. A cutting, or crimping, assembly according to claim 1 wherein one of the first and second frames is provided with at least one carrier member and the other of the first and second frames is provided with at least one guide member, wherein the second frame is rotatably mounted to the first frame by engagement of the at least one carrier member and guide member, with the at least one carrier member being movable along the at least one guide member so as to allow rotation of the second frame relative to the first frame from the first rotational position to the second rotational position.

9. A cutting, or crimping, assembly according to claim 8 wherein the engagement of the carrier member and guide member substantially prevents translational movement of the second frame relative to the first frame, while allowing said rotation of the second frame relative to the first frame.

10. A cutting, or crimping, assembly according to claim 1 wherein the second frame is substantially arcuate.

11. A cutting, or crimping, assembly according to claim 8 wherein the guide member is elongate and extends along a longitudinal axis that is substantially arcuate.

12. A cutting, or crimping, assembly according to claim 1 herein the cutting, or crimping, apparatus is provided with at least one retaining member that is operable to selectively rotationally fix the second frame relative to the first frame.

13. A cutting, or crimping, assembly according to claim 1 wherein the jaw members are mountable on the frame in a plurality of positions such that position of the respective cutting, or crimping, line relative to the frame is varied.

14. A cutting, or crimping, assembly according to claim 1 wherein the inlet conveyor and outlet conveyor are spaced apart, with the cutting, or crimping apparatus being disposed in a gap between the inlet conveyor and outlet conveyor so as to cut, or crimp, wrapping material between adjacent articles as they pass from the inlet conveyor to the outlet conveyor.

15. A cutting, or crimping, assembly according to claim 14 wherein the inlet and outlet conveyors are arranged to transport individual articles, or collations of articles, through the cutting, or crimping, apparatus along a conveyor longitudinal axis and the cutting, or crimping, apparatus is arranged such that the first and second jaw members are movable, and at least a portion of the inlet and outlet conveyors are movable such that the gap between them is movable with the first and second jaw members, in the direction of said conveyor longitudinal axis, as the first and second jaw members are moved relative to each other from the first axial position to the second axial position.

16. A cutting, or crimping, assembly according to claim 15 wherein the inlet and outlet conveyors each comprise a conveyor belt driven by a plurality of rollers, wherein a rear roller of the inlet conveyor and a front roller of the outlet conveyor, disposed on opposite sides of the gap, are movable in the direction of said conveyor longitudinal axis such that said gap is movable in the direction of said conveyor longitudinal axis.

17. A cutting, or crimping, assembly according to claim 15 wherein the first and second jaw members and/or the rear roller of the inlet conveyor and the front roller of the outlet conveyor are mounted on a carriage that is slidably mounted for movement in the direction of said conveyor longitudinal axis.

18. A cutting, or crimping, assembly according to claim 1 wherein the inlet and outlet conveyors are arranged to transport individual articles, or collations of articles, through the cutting, or crimping, apparatus along a longitudinal axis and the jaw members and frame are arranged such that the jaw members are movable between their first and second axial positions in a plane that is substantially perpendicular to said longitudinal axis.

19. A packaging apparatus comprising: a wrapping material applicator for wrapping an article, or a collation of articles in a wrapping material, an applicator inlet conveyor for transporting unwrapped articles towards the applicator; an applicator outlet conveyor for transporting wrapped articles away from the applicator; wherein the packaging apparatus further comprises a cutting, or crimping, assembly according to claim 1 arranged to respectively cut, or crimp wrapping material extending between adjacent articles, or collations of articles.

* * * * *